(12) United States Patent
Källner

(10) Patent No.: US 11,999,236 B2
(45) Date of Patent: Jun. 4, 2024

(54) TRANSMISSION, SINGLE-CLUTCH POWERTRAIN SYSTEM, AND METHOD FOR OPERATING A SINGLE-CLUTCH POWERTRAIN SYSTEM

(71) Applicant: Ningbo Geely Automobile Research & Development Co., Ltd., Ningbo (CN)

(72) Inventor: Ola Källner, Mölndal (SE)

(73) Assignee: NINGBO GEELY AUTOMOBILE RESEARCH & DEV CO., LTD., Ningbo (CN)

( * ) Notice: Subject to any disclaimer, the term of this patent is extended or adjusted under 35 U.S.C. 154(b) by 316 days.

(21) Appl. No.: 17/500,637

(22) Filed: Oct. 13, 2021

(65) Prior Publication Data
US 2022/0032760 A1    Feb. 3, 2022

Related U.S. Application Data

(63) Continuation of application No. PCT/CN2020/084417, filed on Apr. 13, 2020.

(30) Foreign Application Priority Data

May 3, 2019   (EP) .................................... 19172584

(51) Int. Cl.
*B60K 6/36*    (2007.10)
*B60K 6/387*   (2007.10)
(Continued)

(52) U.S. Cl.
CPC ................ *B60K 6/36* (2013.01); *B60K 6/387* (2013.01); *B60K 6/44* (2013.01); *B60K 6/547* (2013.01);
(Continued)

(58) Field of Classification Search
CPC . B60K 6/36; B60K 6/387; B60K 6/44; B60K 6/547; F16H 37/065;
(Continued)

(56) References Cited

U.S. PATENT DOCUMENTS 3,211,249 A * 10/1965 Papst ..................... B60K 6/383
290/19
8,590,425 B2 * 11/2013 Pesola .................... B60K 6/547
74/330
(Continued)

FOREIGN PATENT DOCUMENTS

CN    107264261 A    10/2017
CN    108612812 A    10/2018
(Continued)

OTHER PUBLICATIONS

International Search Report from corresponding International Application No. PCT/CN2020/084417, dated Jul. 14, 2020, 3 pages.

*Primary Examiner* — Ha Dinh Ho
(74) *Attorney, Agent, or Firm* — Tucker Ellis LLP

(57) ABSTRACT

A vehicle transmission includes first and second input gear shafts, an intermediate gear shaft and an output gear shaft. The first input gear shaft has a first torque transmission member, and the second input gear shaft has a first gear wheel. The intermediate gear shaft has second and third gear wheels. The output gear shaft has a fourth gear wheel and a second torque transmission member. The third gear wheel and the fourth gear wheel are arranged to interact with each other for transferring torque from the intermediate gear shaft to the output gear shaft. The first gear wheel and the second gear wheel are arranged to interact with each other for providing a first gear ratio. The first torque transmission member and the second torque transmission member are
(Continued)

arranged to interact with each other via a flexible member for providing a second gear ratio.

16 Claims, 9 Drawing Sheets

(51) Int. Cl.
    *B60K 6/44*     (2007.10)
    *B60K 6/547*     (2007.10)
    *F16H 37/06*     (2006.01)

(52) U.S. Cl.
    CPC ........ *F16H 37/065* (2013.01); *B60Y 2200/92* (2013.01); *B60Y 2400/70* (2013.01); *F16H 2200/0034* (2013.01); *F16H 2200/0039* (2013.01); *F16H 2200/0043* (2013.01)

(58) Field of Classification Search
    CPC ......... F16H 2200/92; F16H 2200/0034; F16H 2200/0039; F16H 2200/0043
    USPC ...................................... 74/661, 665 GE, 330
    See application file for complete search history.

(56) References Cited

U.S. PATENT DOCUMENTS

| | | |
|---|---|---|
| 2007/0199393 A1 | 8/2007 | Hattori |
| 2009/0176617 A1 | 7/2009 | Dilzer |
| 2009/0200094 A1 | 8/2009 | Zohrer |
| 2012/0031229 A1* | 2/2012 | Venturi ................. B60W 10/06 |
| | | 903/909 |
| 2016/0245382 A1 | 8/2016 | Hemphill |
| 2017/0096137 A1 | 4/2017 | Toyama |
| 2017/0190246 A1* | 7/2017 | Venturi ................. B60K 6/547 |
| 2019/0162272 A1* | 5/2019 | Eo ......................... B60K 6/383 |

FOREIGN PATENT DOCUMENTS

| | | |
|---|---|---|
| DE | 102013112388 A1 | 5/2015 |
| EP | 1439086 A2 | 7/2004 |
| JP | 2000278809 A | 10/2000 |

* cited by examiner

TRANSMISSION, SINGLE-CLUTCH POWERTRAIN SYSTEM, AND METHOD FOR OPERATING A SINGLE-CLUTCH POWERTRAIN SYSTEM

RELATED APPLICATION DATA

This application is a continuation of International Patent Application No. PCT/CN2020/084417, filed Apr. 13, 2020, which claims the benefit of European Patent Application No. 19172584.5, filed May 3, 2019, the disclosures of which are incorporated herein by reference in their entireties.

TECHNICAL FIELD

The present disclosure relates to a transmission for a vehicle comprising a first input gear shaft, a second input gear shaft, an intermediate gear shaft and an output gear shaft. The disclosure further relates to a single-clutch powertrain system for hybrid vehicles comprising a transmission, a first electric motor, a second electric motor, and an internal combustion engine, and to a method for operating a single-clutch powertrain system.

BACKGROUND

In vehicle applications, transmissions are commonly used in powertrain systems and there are many different layouts and designs available. In hybrid vehicle applications the transmission is used for transferring torque from two or more power sources that are connected to input gear shafts of the transmission to driving wheels of the vehicle.

Conventional transmissions and powertrain systems are often complex in design and are having large volume constructions with high weight loads. Further, since clutches are used, the transmission is operated with torque interruptions leading to slow gear shifting. Conventional transmissions are designed with a high complexity involving a high number of components, and are often expensive and time consuming to manufacture.

There is thus a need for an improved transmission and powertrain system having a compact layout and low weight, where the transmission is optimized for low volume packing in modern hybrid vehicle designs. Further, there is a need for compact transmissions that are cheap to manufacture and simple in construction with few components, where the transmission is operated with high efficiency and without major torque interruptions.

SUMMARY

An object of the present disclosure is to provide a transmission, a single-clutch powertrain system, and a method, where the previously mentioned problems are avoided.

This object is at least partly achieved by the features of the independent claims. The dependent claims contain further developments of the transmission, the single-clutch powertrain system, and the method.

The disclosure concerns a transmission for a vehicle comprising a first input gear shaft, a second input gear shaft, an intermediate gear shaft and an output gear shaft. The first input gear shaft comprises a first torque transmission member, and the second input gear shaft comprises a first gear wheel. The intermediate gear shaft comprises a second gear wheel, and a third gear wheel. The output gear shaft comprises a fourth gear wheel and a second torque transmission member. The third gear wheel and the fourth gear wheel are arranged to interact with each other for transferring torque from the intermediate gear shaft to the output gear shaft. The first gear wheel and the second gear wheel are arranged to interact with each other for providing a first gear ratio, and the first torque transmission member and the second torque transmission member are arranged to interact with each other via a flexible member for providing a second gear ratio.

Advantages with these features are that a transmission with a compact layout and low weight is achieved, where the transmission is providing two gear ratios. The first torque transmission member and the second torque transmission member are arranged to transfer torque directly from the first input gear shaft to the output gear shaft without the need for complex gear structures. The flexible member may for example be a chain or belt construction suitable for transferring torque in transmission applications allowing a simple design with low weight. Further, the transmission can through the design with the torque transmission members be optimized for low volume packing in modern hybrid vehicle designs, and be manufactured with relatively low costs. The transmission can with the layout disclosed be operated with high efficiency and without major torque interruptions when arranged in a hybrid powertrain system.

According to an aspect of the disclosure, in a first mode, the transmission is configured to transfer torque to the output gear shaft from the second input gear shaft, via the first gear wheel, the second gear wheel, the intermediate gear shaft, the third gear wheel, and the fourth gear wheel. In a second mode, the transmission is configured to transfer torque to the output gear shaft from the first input gear shaft, via the first torque transmission member, the flexible member, and the second torque transmission member. With this configuration, the transmission can be operated in two modes with different input power sources providing different gear ratios. The gears are used for providing torque with the first gear ratio and the torque transmission members a second gear ratio. The torque transmission members are suitable for providing torque at higher vehicle speeds.

According to another aspect of the disclosure, the first input gear shaft further comprises a fifth gear wheel and the intermediate gear shaft further comprises a sixth gear wheel, and the fifth gear wheel and the sixth gear wheel are arranged to interact with each other for providing a third gear ratio. With this configuration of the transmission, a three gear ratio design is achieved. The transmission can be designed with a compact layout and the different combinations of gears are used for providing torque with two different gear ratios, and the torque transmission members can be used for providing a further gear ratio that for example may be suitable for higher vehicle speeds.

According to an aspect of the disclosure, the system further comprises a first coupling unit arranged on the first input gear shaft. The first coupling unit is arranged for selective interaction between the fifth gear wheel and the first torque transmission member for changing gear ratio. The first coupling unit is arranged to shift between the fifth gear wheel and the first torque transmission member, wherein the transmission can deliver torque from the first input gear shaft with different gear ratios.

According to another aspect of the disclosure, the first coupling unit is a synchronizer arranged on the first input gear shaft, wherein the fifth gear wheel is journally connected to the first input gear shaft via a first bearing, and wherein the first torque transmission member is journally connected to the first input gear shaft via a second bearing. The synchronizer is providing an efficient shifting between the fifth gear wheel and the first torque transmission member. The bearings are used to provide an idle position for the fifth gear wheel or the first torque transmission member when not engaged to the synchronizer.

According to a further aspect of the disclosure, in a third mode, the transmission is configured to transfer torque to the output gear shaft from the first input gear shaft, via the fifth gear wheel, the sixth gear wheel, the intermediate gear shaft, the third gear wheel, and the fourth gear wheel. With this configuration, the transmission can be operated in three modes with different input power sources providing different gear ratios. The gears are used for providing torque with two different gear ratios and the torque transmission members is providing a further gear ratio, that for example may be suitable for higher vehicle speeds.

According to an aspect of the disclosure, the second input gear shaft further comprises a seventh gear wheel and the intermediate gear shaft further comprises an eight gear wheel, wherein the seventh gear wheel and the eight gear wheel are arranged to interact with each other for providing a fourth gear ratio. With this configuration of the transmission, a four gear ratio design is achieved. The transmission can be designed with a compact layout and the different combinations of gears are used for providing torque with three different gear ratios, and the torque transmission members can be used for providing a further gear ratio. If the fifth gear wheel and the sixth gear wheel are omitted in the transmission design, the transmission is with the seventh gear wheel and the eight gear wheel instead providing a three gear ratio design.

According to another aspect of the disclosure, the system further comprises a second coupling unit arranged on the second input gear shaft. The second coupling unit is arranged for selective interaction between the seventh gear wheel and the first gear wheel for changing gear ratio. The second coupling unit is arranged to shift between the first gear wheel and the seventh gear wheel, wherein the transmission can deliver torque from the second input gear shaft with different gear ratios.

According to a further aspect of the disclosure, the second coupling unit is a synchronizer arranged on the second input gear shaft, wherein the seventh gear wheel is journally connected to the second input gear shaft via a third bearing, and wherein the first gear wheel is journally connected to the second input gear shaft via a fourth bearing. The synchronizer is providing an efficient shifting between the first gear wheel and the seventh gear wheel. The bearings are used to provide an idle position for the first gear wheel or the seventh gear wheel not engaged to the synchronizer.

According to an aspect of the disclosure, in a fourth mode, the transmission is configured to transfer torque to the output gear shaft from the second input gear shaft, via the seventh gear wheel, the eight gear wheel, the intermediate gear shaft, the third gear wheel, and the fourth gear wheel. With this configuration, the transmission can be operated in four modes with different input power sources providing different gear ratios. The gears may be used for providing torque with three different gear ratios and the torque transmission members is providing a further gear ratio, that for example may be suitable for higher vehicle speeds.

According to an aspect of the disclosure, the first torque transmission member is a first chain sprocket, the second torque transmission member is a second chain sprocket, and the flexible member is a chain, where the first chain sprocket and the second chain sprocket are arranged to interact with each other via the chain; or the first torque transmission member is a first belt pulley, the second torque transmission member is a second belt pulley, and the flexible member is a belt, where the first belt pulley and the second belt pulley are arranged to interact with each other via the belt. Chains or belts are suitable for transferring torque between the torque transmission members, and provide a compact layout and construction of the transmission.

The disclosure further concerns a single-clutch powertrain system for hybrid vehicles comprising a transmission described above. The system further comprises a first electric motor, a second electric motor, an internal combustion engine, and a clutch. The first electric motor is connected to the first input gear shaft, the second electric motor is connected to the second input gear shaft. The internal combustion engine is connectable to the first input gear shaft via the clutch where the clutch is arranged to selectively connect the internal combustion engine to and disconnect the internal combustion engine from the first input gear shaft, or the internal combustion engine is connectable to the second input gear shaft via the clutch where the clutch is arranged to selectively connect the internal combustion engine to and disconnect the internal combustion engine from the second input gear shaft. The powertrain system is configured as a single-clutch hybrid system, where the clutch is used for connecting the internal combustion engine to the first input gear shaft or alternatively to the second input gear shaft depending on the design of the system. Since the electric motors are connected to the respective input gear shafts, the powertrain system can be configured to operate without torque interruptions when connecting and disconnecting the internal combustion engine via the clutch. The layout of the system can be made compact and efficient, with lower costs compared to conventional powertrain systems.

According to an aspect of the disclosure, the system is configured to transfer torque to the first input gear shaft by the first electric motor and/or the internal combustion engine, and transfer torque to the second input gear shaft by the second electric motor; or the system is configured to transfer torque to the first input gear shaft by the first electric motor, and transfer torque to the second input gear shaft by the second electric motor and/or the internal combustion engine. The layout of the system is providing a flexible configuration with different possibilities for connecting the internal combustion engine.

The disclosure further concerns a method for operating a single-clutch powertrain system for hybrid vehicles, where the powertrain system comprises a first electric motor, a second electric motor, an internal combustion engine, a transmission, and a clutch. The transmission comprises a first input gear shaft, a second input gear shaft, an intermediate gear shaft and an output gear shaft. The first input gear shaft comprises a first torque transmission member, and the second input gear shaft comprises a first gear wheel. The intermediate gear shaft comprises a second gear wheel and a third gear wheel. The output gear shaft comprises a fourth gear wheel and a second torque transmission member. The method comprises the steps: connecting the first electric motor to the first input gear shaft, the second electric motor to the second input gear shaft, and the internal combustion engine to the first input gear shaft or the second input gear shaft via the clutch, wherein the clutch is selectively connecting the internal combustion engine to and disconnecting the internal combustion engine from the first input gear shaft or the second input gear shaft; when receiving a command to operate the powertrain system with a first gear ratio, transferring torque from the second input gear shaft to the output gear shaft via the intermediate gear shaft for providing the first gear ratio, wherein the first gear wheel is interacting with the second gear wheel and the third gear wheel is interacting with the fourth gear wheel; and when receiving a command to operate the powertrain system with a second gear ratio, transferring torque from the first input gear shaft directly to the output gear shaft for providing the second gear ratio, wherein the first torque transmission member is interacting with the second torque transmission member via a flexible member. The method is providing an efficient two gear ratio operation of the powertrain system, where the internal combustion engine can be connected to the first input gear shaft or alternatively to the second input gear shaft.

According to an aspect of the disclosure, the first input gear shaft further comprises a fifth gear wheel and the intermediate gear shaft further comprises a sixth gear wheel. The method further comprises the step: when receiving a command to operate the powertrain system with a third gear ratio, transferring torque from the first input gear shaft to the output gear shaft via the intermediate gear shaft for providing the third gear ratio, wherein the fifth gear wheel is interacting with the sixth gear wheel and the third gear wheel is interacting with the fourth gear wheel. The method is providing an efficient three gear ratio operation of the powertrain system.

According to another aspect of the disclosure, the second input gear shaft further comprises a seventh gear wheel and the intermediate gear shaft further comprises an eight gear wheel. The method further comprises the step: when receiving a command to operate the powertrain system with a fourth gear ratio, transferring torque from the second input gear shaft to the output gear shaft via the intermediate gear shaft for providing the third gear ratio, wherein the seventh gear wheel is interacting with the eight gear wheel and the third gear wheel is interacting with the fourth gear wheel. The method is providing an efficient four gear ratio operation of the powertrain system.

BRIEF DESCRIPTION OF THE DRAWINGS

The disclosure will be described in greater detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1A:
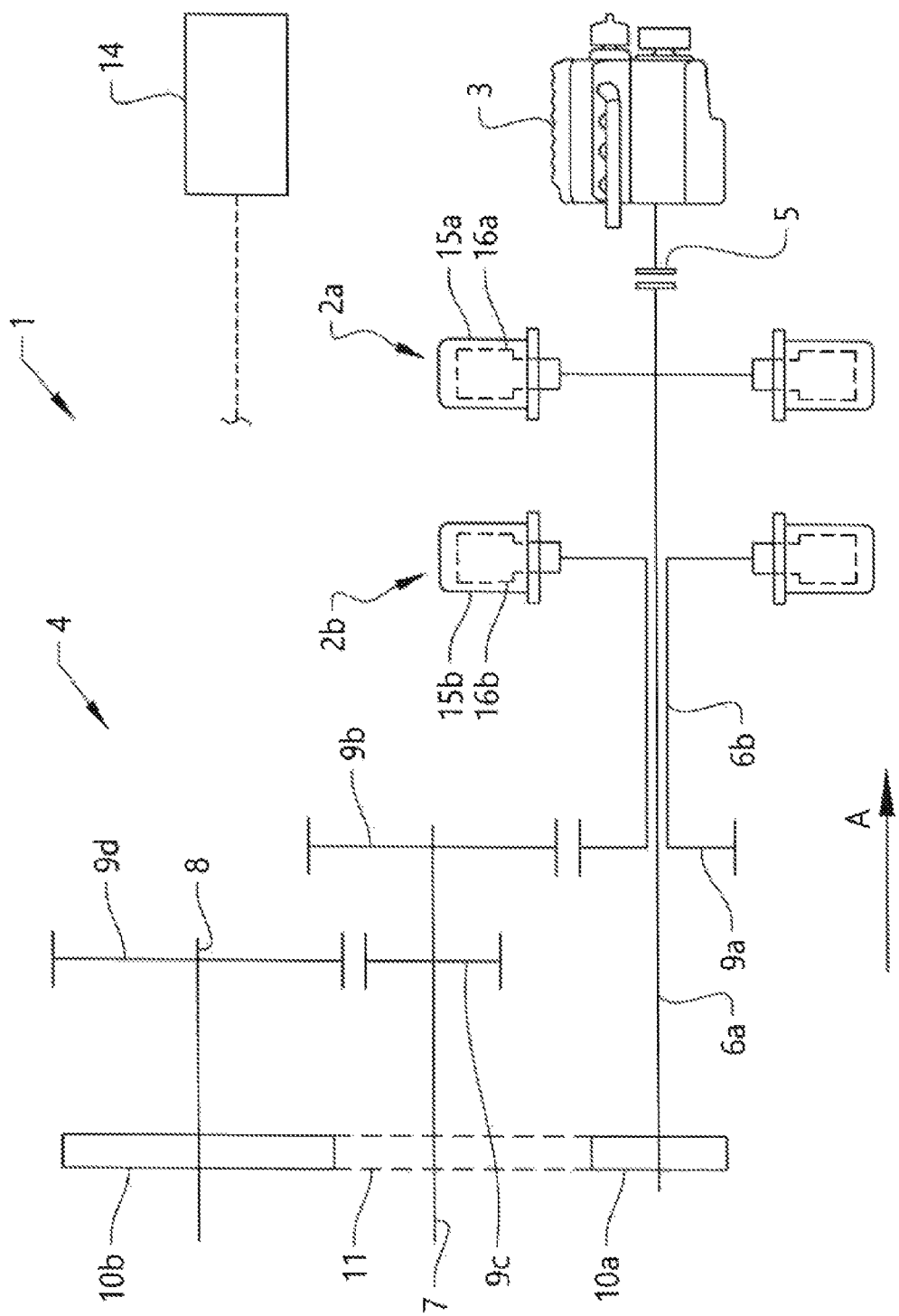
FIGS. 1A-1B show schematically, layout views of two gear ratio single-clutch powertrain systems according to the disclosure.

FIG. 1A schematically shows a first embodiment of a single-clutch powertrain system 1 for a hybrid vehicle according to the disclosure, where the powertrain system has a two gear ratio layout. The powertrain system 1 comprises a first electric motor 2a, a second electric motor 2b, an internal combustion engine 3, a transmission 4, and a clutch 5. The transmission 4 comprises a first input gear shaft 6a, a second input gear shaft 6b, an intermediate gear shaft 7 and an output gear shaft 8, as illustrated in FIG. 1A. The first input gear shaft 6a and the second input gear shaft 6b are concentrically arranged in relation to each other, and the first input gear shaft 6a is an inner shaft, and the second input gear shaft 6b is an outer shaft arranged concentrically outside the first input gear shaft 6a. The first input gear shaft 6a, the second input gear shaft 6b, the intermediate gear shaft 7, and the output gear shaft 8, are arranged to extend in a parallel relationship to each other in an axial direction A of the powertrain system 1.

In the first embodiment shown in FIG. 1A, the first electric motor 2a is connected to the first input gear shaft 6a and the second electric motor 2b is connected to the second input gear shaft 6b. The first electric motor 2a comprises a first stator 15a and a first rotor 16a, where the first rotor 16a is drivingly connected to the first input shaft 6a. The second electric motor 2b comprises a second stator 15b and a second rotor 16b, where the second rotor 16b is drivingly connected to the second input shaft 6b.

The internal combustion engine 3 is connectable to the first input gear shaft 6a via the clutch 5, and the clutch 5 is arranged to selectively connect the internal combustion engine 3 to and disconnect the internal combustion engine 3 from the first input gear shaft 6a depending on the driving mode of the vehicle. The first input gear shaft 6a comprises a first torque transmission member 10a and the second input gear shaft 6b comprises a first gear wheel 9a. The intermediate gear shaft 7 comprises a second gear wheel 9b and a third gear wheel 9c. The output gear shaft 8 comprises a fourth gear wheel 9d and a second torque transmission member 10b. The third gear wheel 9c and the fourth gear wheel 9d are arranged to interact with each other for transferring torque from the intermediate gear shaft 7 to the output gear shaft 8. The first gear wheel 9a and the second gear wheel 9b are arranged to interact with each other for providing a first gear ratio, and the first torque transmission member 10a and the second torque transmission member 10b are arranged to interact with each other via a flexible member 11 for providing a second gear ratio. Thus, with the layout described, the transmission is arranged for providing two different gear ratios. The torque transmission members are transferring torque directly between the first input gear shaft 6a and the output gears shaft 8 via the flexible member 11, and with this design, the transmission and powertrain can be constructed with a compact layout.

The powertrain system 1 is in the first embodiment thus configured to transfer torque to the first input gear shaft 6a by the first electric motor 2a and/or the internal combustion engine 3, and transfer torque to the second input gear shaft 6b by the second electric motor 2b.

The gearing between the respective first gear wheel 9a and second gear wheel 9b, the third gear wheel 9c and fourth gear wheel 9d, and the first torque transmission member 10a and second torque transmission member 10b, may be selected to match the specific powertrain configuration and may depend on the size of the electric motors and the internal combustion engine, the type of hybrid vehicle in which the transmission and powertrain are used, and on the desired performance and driving characteristics.

In the first embodiment, the transmission 4 is in a first mode configured to transfer torque to the output gear shaft 8 from the second input gear shaft 6b, via the first gear wheel 9a, the second gear wheel 9b, the intermediate gear shaft 7, the third gear wheel 9c, and the fourth gear wheel 9d, with the first gear ratio. In a second mode, the transmission 4 is configured to transfer torque to the output gear shaft 8 from the first input gear shaft 6a, via the first torque transmission member 10a, the flexible member 11, and the second torque transmission member 10b, with the second gear ratio. The first mode with the first gear ratio is suitably used for forward driving at lower speeds and for reverse driving. The second gear ratio is suitably used for forward driving at higher speeds. The sizes of and number of gears on the gear wheels may be suitably selected for a specific gearing that is matching the vehicle construction, and in the same way, the sizes of the torque transmission members may be suitably selected for a specific gearing. In a boost forward gear mode, the powertrain system 1 may be configured to transfer torque to the output gear shaft 8 simultaneously by the first electric motor 2a, the second electric motor 2b, and the internal combustion engine 3. When the three power sources are operated together, a maximum power can be provided to the output gear shaft 8 via the transmission 4. In a charge mode, the powertrain system 1 may be configured for charging a battery pack 14, where the first electric motor 2a and/or the second electric motor 2b are used as generators driven by the internal combustion engine 3. In the charge mode, the propulsion of the vehicle may be accomplished with the internal combustion engine 3 alone or in combination with any of the electric motors 2a,2b.

To operate the powertrain in the first embodiment, the second electric motor 2b may provide torque to the output gear shaft 8 at lower speeds and at reverse driving. In this drive mode, the internal combustion engine 3 is not connected to the transmission via the clutch 5, and the rotor 16a of the first electric motor 2a may be arranged to rotate with the first input gear shaft 6a without providing torque. At higher speeds, the first electric motor 2a is providing torque to the output gear shaft 8, either on its own or together with the internal combustion engine 3 in hybrid drive via the connected clutch 5. In this drive mode, the rotor 16b of the second electric motor 2b may be arranged to rotate with the second input gear shaft 6b without providing torque.

When the powertrain system 1 of the first embodiment is operated, the first electric motor 2a is connected to the first input gear shaft 6a, the second electric motor 2b to the second input gear shaft 6b, and the internal combustion engine 3 to the first input gear shaft 6a via the clutch 5. The clutch 5 is selectively connecting the internal combustion engine 3 to and disconnecting the internal combustion engine 3 from the first input gear shaft 6a. When receiving a command to operate the powertrain system 1 with a first gear ratio, torque is transferred from the second input gear shaft 6b to the output gear shaft 8 via the intermediate gear shaft 7 for providing the first gear ratio, wherein the first gear wheel 9a is interacting with the second gear wheel 9b and the third gear wheel 9c is interacting with the fourth gear wheel 9d. When receiving a command to operate the powertrain system 1 with a second gear ratio, torque is transferred from the first input gear shaft 6a directly to the output gear shaft 8 for providing the second gear ratio, wherein the first torque transmission member 10a is interacting with the second torque transmission member 10b via a flexible member 11.

Figure 1B:
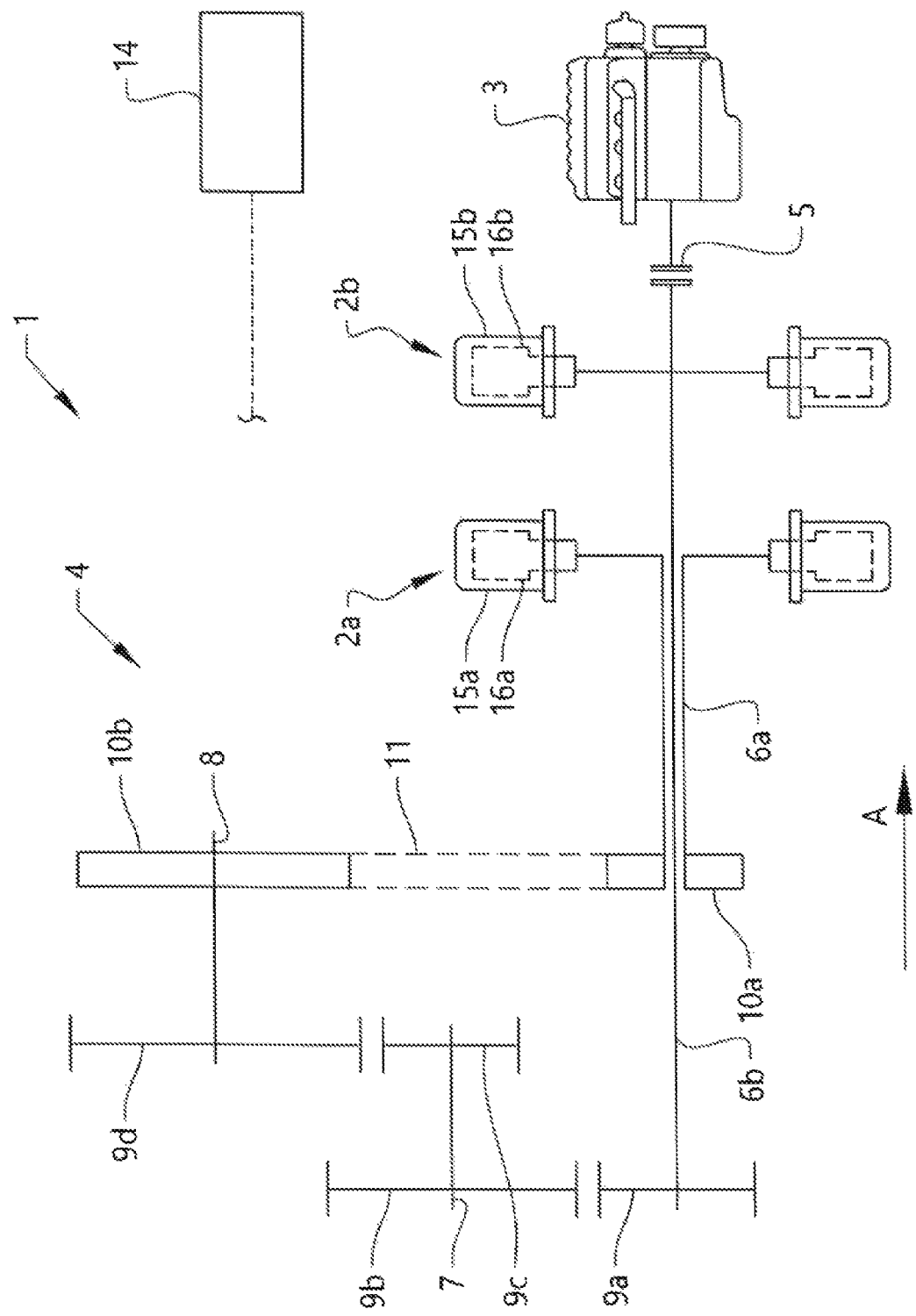

In FIG. 1B, a second embodiment of the two gear ratio powertrain system layout is shown. The first input gear shaft 6a is in this embodiment instead arranged as the outer input gear shaft and the second input gear shaft 6b is arranged as the inner gear shaft. The first input gear shaft 6a and the second input gear shaft 6b are concentrically arranged in relation to each other, and the first input gear shaft 6a is arranged concentrically outside the second input gear shaft 6b. The first input gear shaft 6a, the second input gear shaft 6b, the intermediate gear shaft 7, and the output gear shaft 8, are arranged to extend in a parallel relationship to each other in an axial direction A of the powertrain system 1.

In the second embodiment shown in FIG. 1B, the first torque transmission member 10a is arranged on the outer first input gear shaft 6a, and the first gear wheel 9a on the inner second input gear shaft 6b. The first electric motor 2a is connected to the first input gear shaft 6a and the second electric motor 2b is connected to the second input gear shaft 6b. The first electric motor 2a comprises a first stator 15a and a first rotor 16a, where the first rotor 16a is drivingly connected to the first input shaft 6a. The second electric motor 2b comprises a second stator 15b and a second rotor 16b, where the second rotor 16b is drivingly connected to the second input shaft 6b. The internal combustion engine 3 is connectable to the inner second input gear shaft 6b via the clutch 5, and the clutch 5 is arranged to selectively connect the internal combustion engine 3 to and disconnect the internal combustion engine 3 from the second input gear shaft 6b depending on the driving mode of the vehicle. The powertrain operation, powertrain driving modes, and other configurations of the transmission 4 are similar to the ones described in relation to the first embodiment above, where the intermediate gear shaft 7 comprises a second gear wheel 9b and a third gear wheel 9c, and the output gear shaft 8 comprises a fourth gear wheel 9d and a second torque transmission member 10b. The third gear wheel 9c and the fourth gear wheel 9d are arranged to interact with each other for transferring torque from the intermediate gear shaft 7 to the output gear shaft 8. The first gear wheel 9a and the second gear wheel 9b are arranged to interact with each other for providing a first gear ratio, and the first torque transmission member 10a and the second torque transmission member 10b are arranged to interact with each other via the flexible member 11 for providing a second gear ratio.

The powertrain system 1 is in the second embodiment thus configured to transfer torque to the first input gear shaft 6a by the first electric motor 2a, and transfer torque to the second input gear shaft 6b by the second electric motor 2b and/or the internal combustion engine 3.

When the powertrain system 1 of the second embodiment is operated, the first electric motor 2a is connected to the first input gear shaft 6a, the second electric motor 2b to the second input gear shaft 6b, and the internal combustion engine 3 to the second input gear shaft 6b via the clutch 5. The clutch 5 is selectively connecting the internal combustion engine 3 to and disconnecting the internal combustion engine 3 from the second input gear shaft 6b. When receiving a command to operate the powertrain system 1 with a first gear ratio, torque is transferred from the second input gear shaft 6b to the output gear shaft 8 via the intermediate gear shaft 7 for providing the first gear ratio, wherein the first gear wheel 9a is interacting with the second gear wheel 9b and the third gear wheel 9c is interacting with the fourth gear wheel 9d. When receiving a command to operate the powertrain system 1 with a second gear ratio, torque is transferred from the first input gear shaft 6a directly to the output gear shaft 8 for providing the second gear ratio, wherein the first torque transmission member 10a is interacting with the second torque transmission member 10b via the flexible member 11.

Figure 2A:
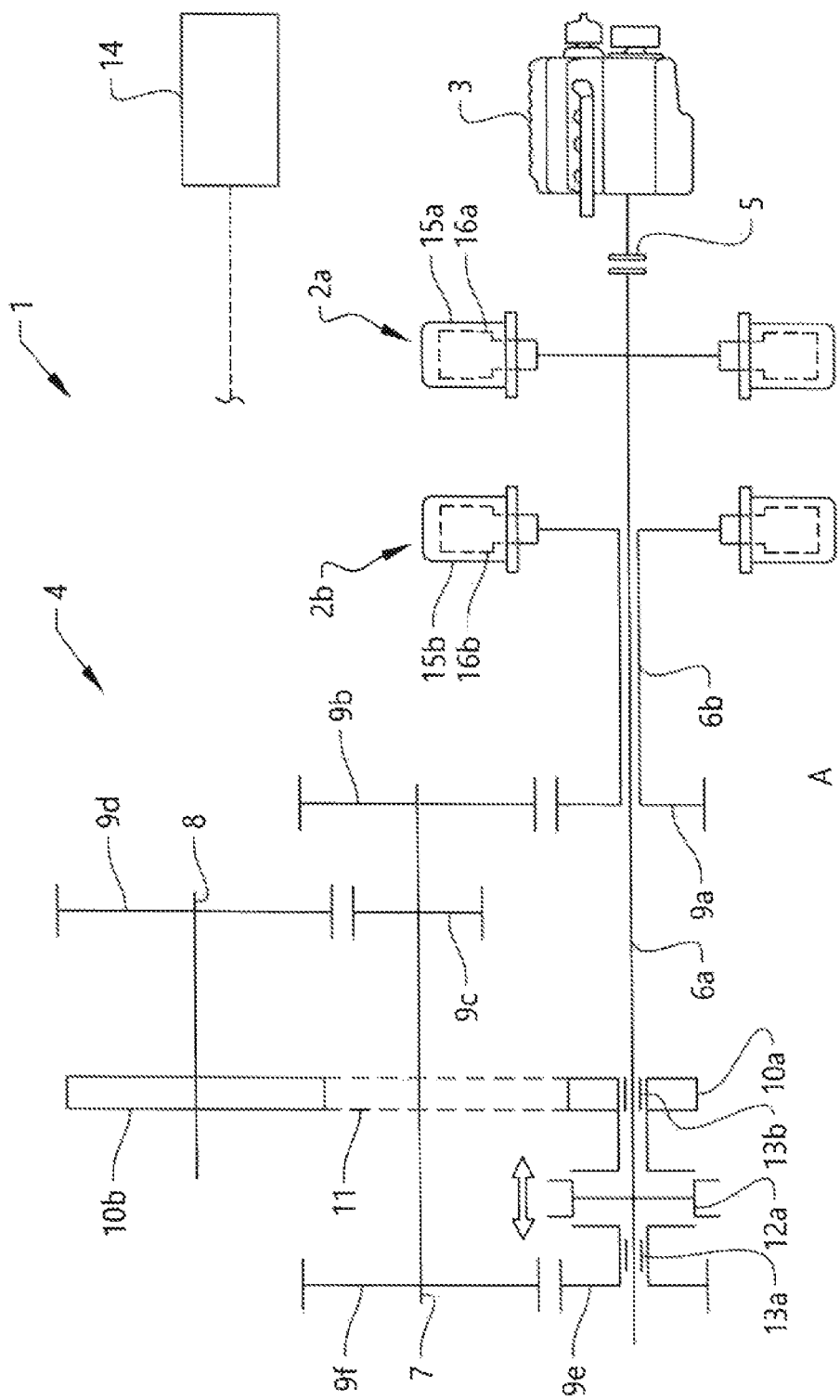
FIGS. 2A-2C show schematically, a layout view, a cross-sectional view, and a perspective view, of a three gear ratio single-clutch powertrain system according to the disclosure.
Figure 2B:
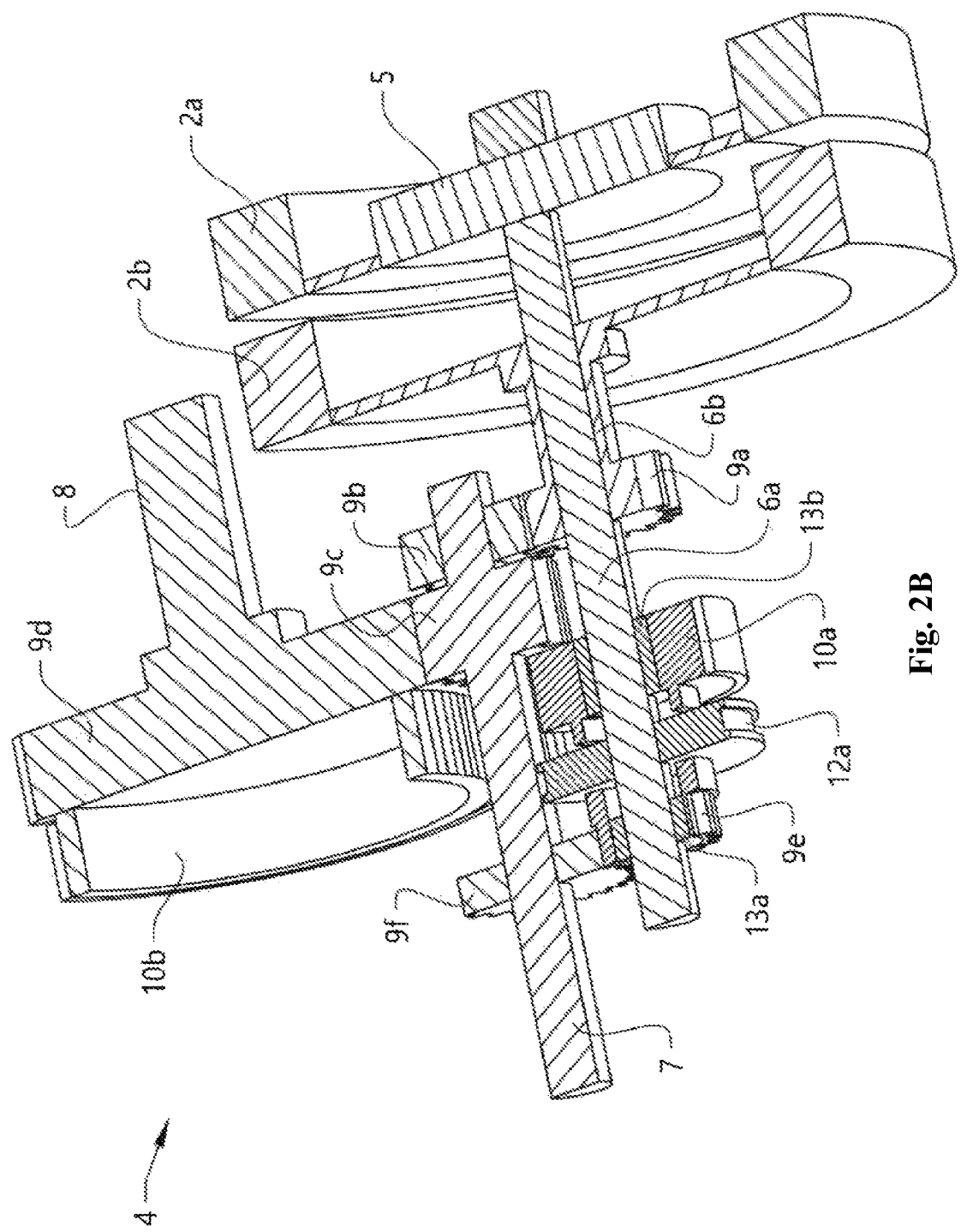
Figure 2C:
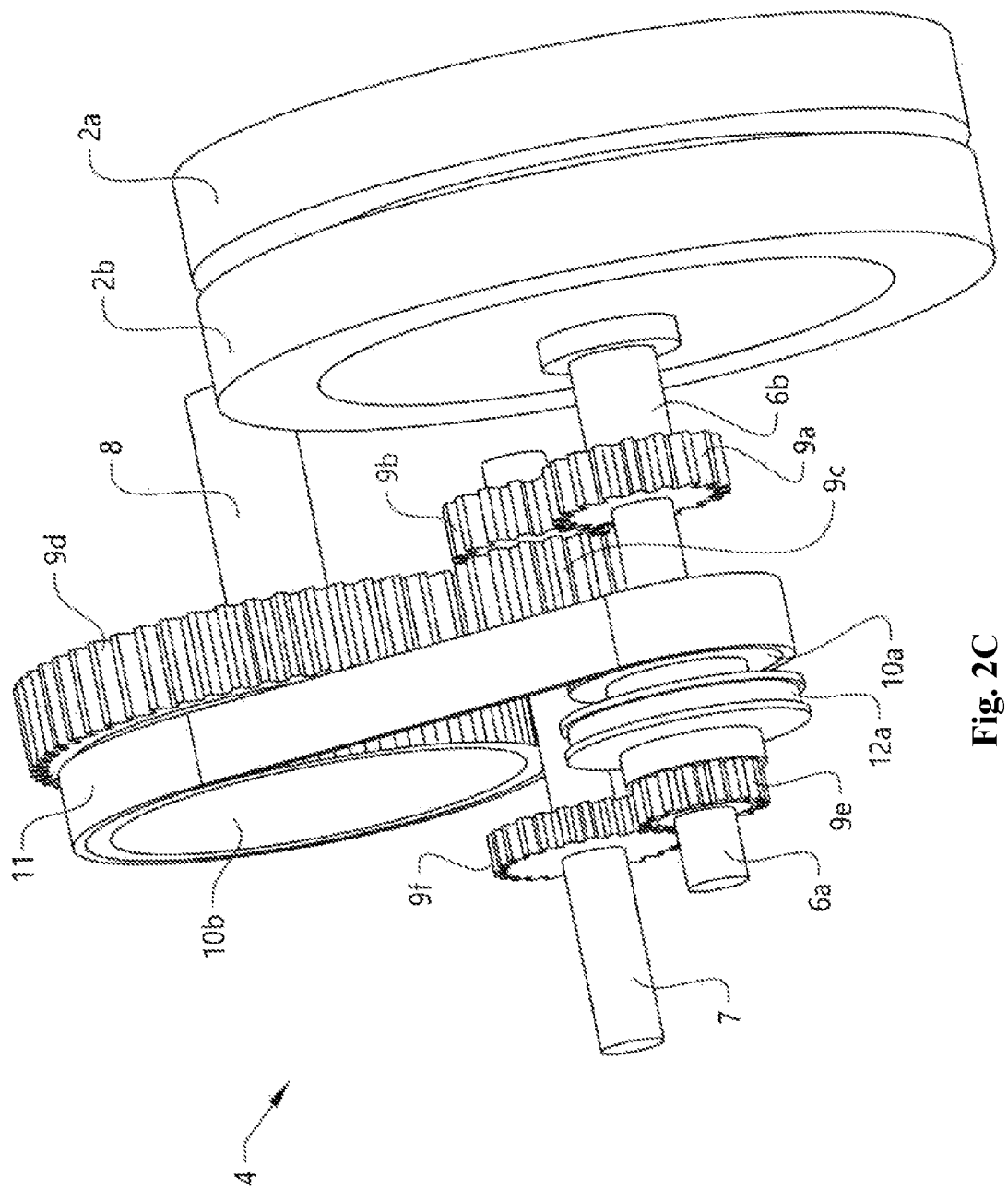

In FIGS. 2A-2C, a third embodiment of the powertrain system 1 is shown in a three gear ratio layout. The layout in the third embodiment is partly the same as the layout described in the first embodiment shown in FIG. 1A with the same components. In the third embodiment, in comparison to the first embodiment, the first input gear shaft 6a further comprises a fifth gear wheel 9e and the intermediate gear shaft 7 further comprises a sixth gear wheel 9f. The fifth gear wheel 9e and the sixth gear wheel 9f are arranged to interact with each other for providing a third gear ratio. Further, the powertrain system 1 in the third embodiment comprises a first coupling unit 12a arranged on the first input gear shaft 6a. The first coupling unit 12a is arranged for selective interaction between the fifth gear wheel 9e and the first torque transmission member 10a for changing gear ratio. The first coupling unit 12a is arranged to selectively be in driving engagement with and shift between the fifth gear wheel 9e and the first torque transmission member 10a, wherein the transmission 4 can deliver torque from the first input gear shaft 6a with different gear ratios. The first coupling unit 12a may further be arranged in a position where it is not in driving engagement with any of the fifth gear wheel 9e and the first torque transmission member 10a.

The powertrain system 1 is in the third embodiment shown in FIGS. 2A-2C thus configured to transfer torque to the first input gear shaft 6a by the first electric motor 2a and/or the internal combustion engine 3, and transfer torque to the second input gear shaft 6b by the second electric motor 2b. The first electric motor 2a comprises a first stator 15a and a first rotor 16a, where the first rotor 16a is drivingly connected to the first input shaft 6a. The second electric motor 2b comprises a second stator 15b and a second rotor 16b, where the second rotor 16b is drivingly connected to the second input shaft 6b.

The first coupling unit 12a may suitably be a synchronizer or similar arrangement arranged on the first input gear shaft 6a. The synchronizer may be of any configuration suitable for hybrid transmissions. The fifth gear wheel 9e is journally connected to the first input gear shaft 6a via a first bearing 13a, and the first torque transmission member 10a is journally connected to the first input gear shaft 6a via a second bearing 13b. The synchronizer is providing an efficient shifting between the fifth gear wheel and the first torque transmission member. The first bearing 13a and the second bearing 13b are used to provide an idle position for the fifth gear wheel 9e and the first torque transmission member 10a respectively when not in driving engagement with the synchronizer.

The gearing between the respective first gear wheel 9a and second gear wheel 9b, the third gear wheel 9c and fourth gear wheel 9d, the fifth gear wheel 9e and sixth gear wheel 9f, and the first torque transmission member 10a and second torque transmission member 10b, may be selected to match the specific powertrain configuration and may depend on the size of the electric motors and the internal combustion engine, the type of hybrid vehicle in which the transmission and powertrain are used, and on the desired performance and driving characteristics.

In the third embodiment, as illustrated in FIGS. 2A-2C, the transmission 4 is in a first mode configured to transfer torque to the output gear shaft 8 from the second input gear shaft 6b, via the first gear wheel 9a, the second gear wheel 9b, the intermediate gear shaft 7, the third gear wheel 9c, and the fourth gear wheel 9d, with the first gear ratio. In a second mode, the transmission 4 is configured to transfer torque to the output gear shaft 8 from the first input gear shaft 6a, via the first coupling unit 12a, the first torque transmission member 10a, the flexible member 11, and the second torque transmission member 10b, with the second gear ratio. In a third mode, the transmission 4 is configured to transfer torque to the output gear shaft 8 from the first input gear shaft 6a, via the first coupling unit 12a, the fifth gear wheel 9e, the sixth gear wheel 9f, the intermediate gear shaft 7, the third gear wheel 9c, and the fourth gear wheel 9d. The first mode with the first gear ratio or the third mode with the third gear ratio is suitably used for forward driving at lower speeds and for reverse driving. The second gear ratio is suitably used for forward driving at higher speeds. The sizes of and number of gears on the gear wheels may be suitably selected for a specific gearing that is matching the vehicle construction, and in the same way, the sizes of the torque transmission members may be suitably selected for a specific gearing. In a boost forward gear mode, the powertrain system 1 may be configured to transfer torque to the output gear shaft 8 simultaneously by the first electric motor 2a, the second electric motor 2b, and the internal combustion engine 3. When the three power sources are operated together, a maximum power can be provided to the output gear shaft 8 via the transmission 4. In a charge mode, the powertrain system 1 may be configured for charging a battery pack 14, where the first electric motor 2a and/or the second electric motor 2b are used as generators driven by the internal combustion engine. In the charge mode, the propulsion of the vehicle may be accomplished with the internal combustion engine 3 alone or in combination with any of the electric motors 2a,2b.

To operate the powertrain in the third embodiment, the first electric motor 2a or the second electric motor 2b may suitably provide torque to the output gear shaft 8 at lower speeds and at reverse driving. At higher speeds, the first electric motor 2a may be arranged to provide torque to the output gear shaft 8, either on its own or together with the internal combustion engine 3 in hybrid drive via the connected clutch 5.

When the powertrain system 1 of the third embodiment is operated, the first electric motor 2a is connected to the first input gear shaft 6a, the second electric motor 2b to the second input gear shaft 6b, and the internal combustion engine 3 to the first input gear shaft 6a via the clutch 5. The clutch 5 is selectively connecting the internal combustion engine 3 to and disconnecting the internal combustion engine 3 from the first input gear shaft 6a. When receiving a command to operate the powertrain system 1 with a first gear ratio, torque is transferred from the second input gear shaft 6b to the output gear shaft 8 via the intermediate gear shaft 7 for providing the first gear ratio, wherein the first gear wheel 9a is interacting with the second gear wheel 9b and the third gear wheel 9c is interacting with the fourth gear wheel 9d. When receiving a command to operate the powertrain system 1 with a second gear ratio, torque is transferred from the first input gear shaft 6a directly to the output gear shaft 8 for providing the second gear ratio, wherein the first torque transmission member 10a is interacting with the second torque transmission member 10b via the flexible member 11. In this operational mode, the first coupling unit 12a is engaging the first torque transmission member 10a, and is disconnected from the fifth gear wheel 9e. When receiving a command to operate the powertrain system 1 with a third gear ratio, torque is transferred from the first input gear shaft 6a to the output gear shaft 8 via the intermediate gear shaft 7 for providing the third gear ratio, wherein the fifth gear wheel 9e is interacting with the sixth gear wheel 9f and the third gear wheel 9c is interacting with the fourth gear wheel 9d. In this operational mode, the first coupling unit 12a is engaging the fifth gear wheel 9e, and is disconnected from the first torque transmission member 10a.

It would in an alternative three gear ratio powertrain layout be possible to arrange the first input gear shaft as the outer input gear shaft and the second input gear shaft as the inner gear shaft, with the first torque transmission member instead arranged on the outer first input gear shaft, in a similar way as described in the second embodiment shown in FIG. 1B. The first coupling unit would then be arranged on the outer first input gear shaft for selective interaction between the first gear wheel and the first torque transmission member for changing gear ratio.

Figure 3A:
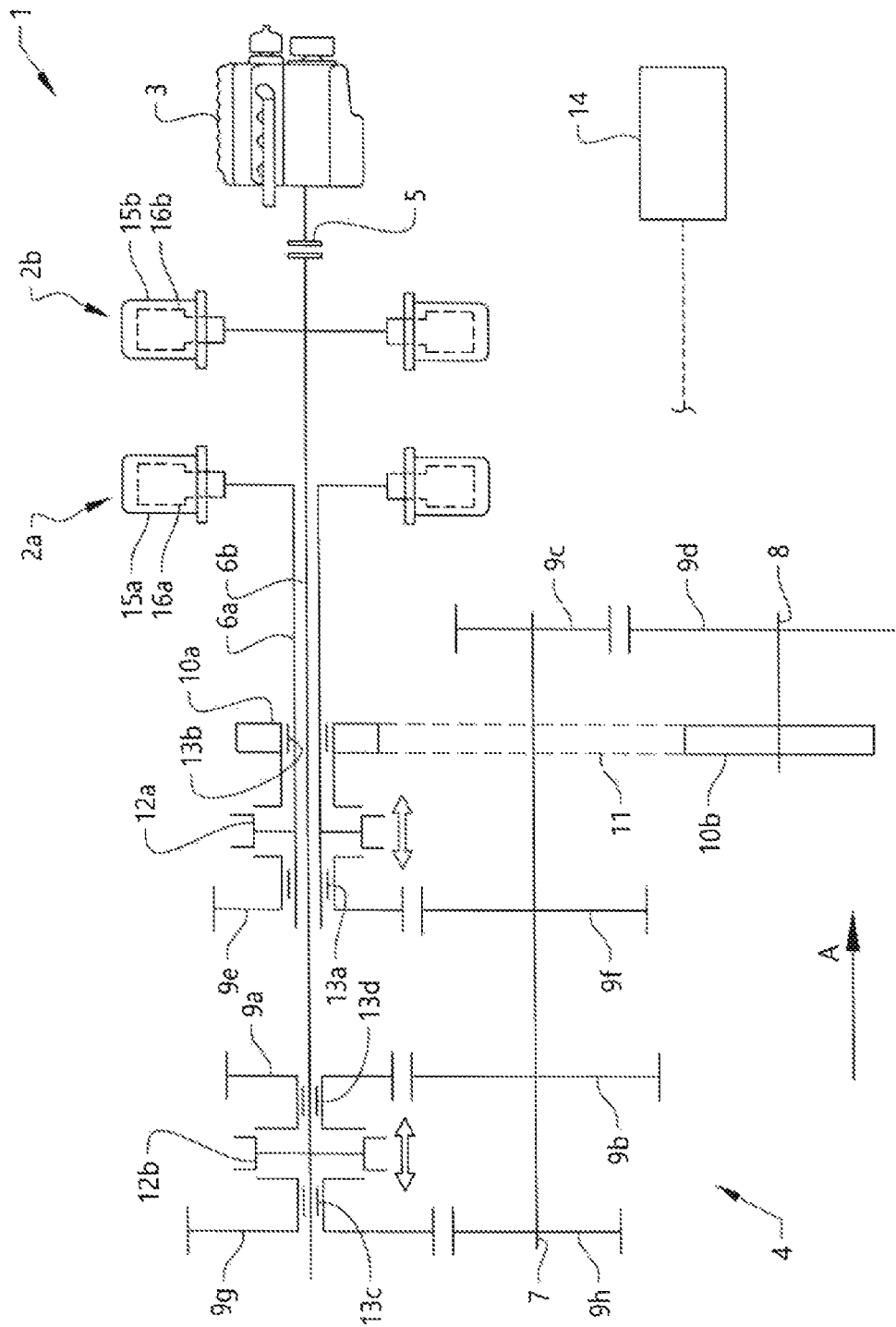
FIGS. 3A-3C show schematically, a layout view, a cross-sectional view, and a perspective view, of a four gear ratio single-clutch powertrain system according to the disclosure.
Figure 3B:
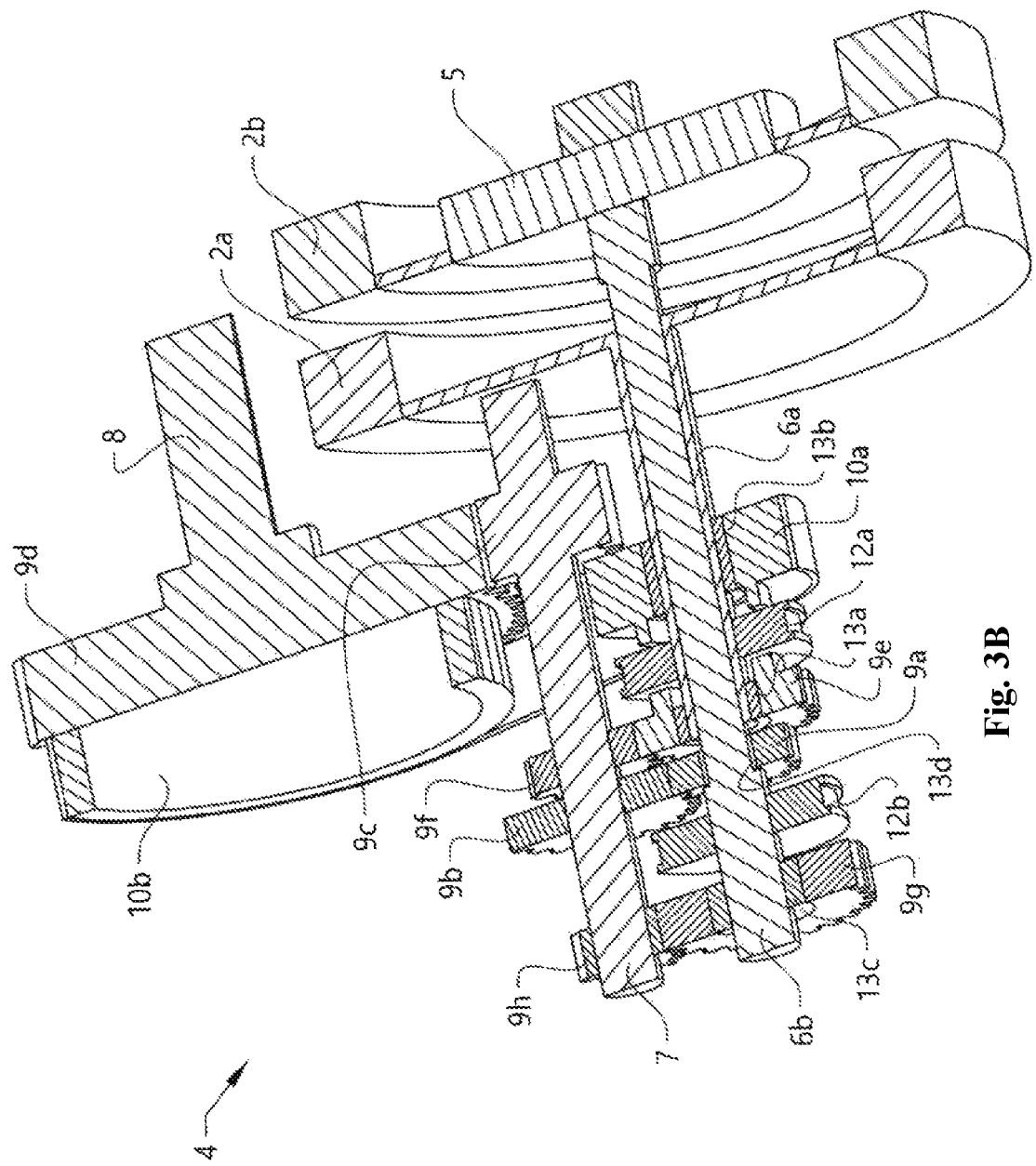
Figure 3C:
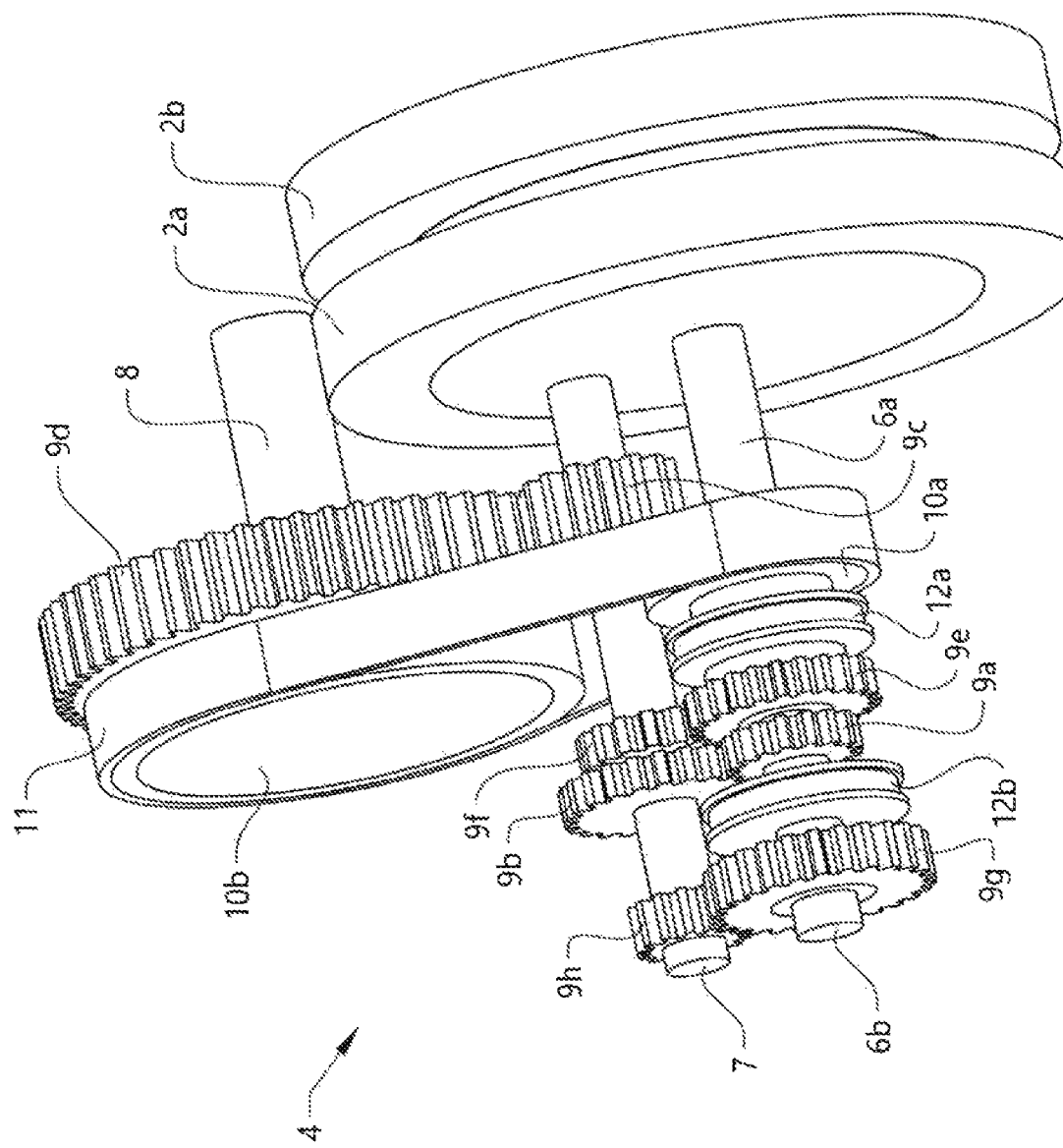

In FIGS. 3A-3C, a fourth embodiment of the single-clutch powertrain system 1 is shown in a four gear ratio layout. The powertrain system 1 comprises a first electric motor 2a, a second electric motor 2b, an internal combustion engine 3, a transmission 4, and a clutch 5. The transmission 4 comprises a first input gear shaft 6a, a second input gear shaft 6b, an intermediate gear shaft 7 and an output gear shaft 8, as illustrated in FIGS. 3A-3C. The first input gear shaft 6a and the second input gear shaft 6b are concentrically arranged in relation to each other, and the first input gear shaft 6a is an outer shaft, and the second input gear shaft 6b is an inner shaft arranged concentrically inside the first input gear shaft 6a. The first input gear shaft 6a, the second input gear shaft 6b, the intermediate gear shaft 7, and the output gear shaft 8, are arranged to extend in a parallel relationship to each other in an axial direction A of the powertrain system 1.

In the fourth embodiment shown in FIGS. 3A-3C, the first electric motor 2a is connected to the first input gear shaft 6a and the second electric motor 2b is connected to the second input gear shaft 6b. The first electric motor 2a comprises a first stator 15a and a first rotor 16a, where the first rotor 16a is drivingly connected to the first input shaft 6a. The second electric motor 2b comprises a second stator 15b and a second rotor 16b, where the second rotor 16b is drivingly connected to the second input shaft 6b. The internal combustion engine 3 is connectable to the second input gear shaft 6b via the clutch 5, and the clutch 5 is arranged to selectively connect the internal combustion engine 3 to and disconnect the internal combustion engine 3 from the second input gear shaft 6b depending on the driving mode of the vehicle. The first input gear shaft 6a comprises a first torque transmission member 10a and the second input gear shaft 6b comprises a first gear wheel 9a. The intermediate gear shaft 7 comprises a second gear wheel 9b and a third gear wheel 9c. The output gear shaft 8 comprises a fourth gear wheel 9d and a second torque transmission member 10b. The third gear wheel 9c and the fourth gear wheel 9d are arranged to interact with each other for transferring torque from the intermediate gear shaft 7 to the output gear shaft 8. The first gear wheel 9a and the second gear wheel 9b are arranged to interact with each other for providing a first gear ratio, and the first torque transmission member 10a and the second torque transmission member 10b are arranged to interact with each other via a flexible member 11 for providing a second gear ratio. The first input gear shaft 6a further comprises a fifth gear wheel 9e and the intermediate gear shaft 7 further comprises a sixth gear wheel 9f. The fifth gear wheel 9e and the sixth gear wheel 9f are arranged to interact with each other for providing a third gear ratio. Further, a first coupling unit 12a is arranged on the first input gear shaft 6a. The first coupling unit 12a is arranged for selective interaction between the fifth gear wheel 9e and the first torque transmission member 10a for changing gear ratio. The first coupling unit 12a is arranged to selectively be in driving engagement with and shift between the fifth gear wheel 9e and the first torque transmission member 10a, wherein the transmission 4 can deliver torque from the first input gear shaft 6a with different gear ratios. The first coupling unit 12a may further be arranged in a position where it is not in driving engagement with any of the fifth gear wheel 9e and the first torque transmission member 10a. The second input gear shaft 6b further comprises a seventh gear wheel 9g and the intermediate gear shaft 7 further comprises an eight gear wheel 9h. The seventh gear wheel 9g and the eight gear wheel 9h are arranged to interact with each other for providing a fourth gear ratio. Further, a second coupling unit 12b is arranged on the second input gear shaft 6b, The second coupling unit 12b is arranged to selectively be in driving engagement with and shift between the seventh gear wheel 9g and the first gear wheel 9a for changing gear ratio, wherein the transmission 4 can deliver torque from the second input gear shaft 6b with different gear ratios. The second coupling unit 12b may further be arranged in a position where it is not in driving engagement with any of the seventh gear wheel 9g and the first gear wheel 9a.

Thus, with the layout described in the fourth embodiment, the transmission 4 is arranged for providing four different gear ratios. The torque transmission members are transferring torque directly between the first input gear shaft 6a and the output gears shaft 8 via the flexible member 11, and with this design, the transmission and powertrain can be constructed with a compact layout.

The powertrain system 1 is in the fourth embodiment thus configured to transfer torque to the first input gear shaft 6a by the first electric motor 2a, and transfer torque to the second input gear shaft 6b by the second electric motor 2b and/or the internal combustion engine 3.

The first coupling unit 12a may suitably be a synchronizer or similar arrangement arranged on the first input gear shaft 6a. The synchronizer may be of any configuration suitable for hybrid transmissions. The fifth gear wheel 9e is journally connected to the first input gear shaft 6a via a first bearing 13a, and the first torque transmission member 10a is journally connected to the first input gear shaft 6a via a second bearing 13b. The synchronizer is providing an efficient shifting between the fifth gear wheel 9e and the first torque transmission member 10a. The first bearing 13a and the second bearing 13b are used to provide an idle position for the fifth gear wheel 9e and the first torque transmission member 10a respectively when not in driving engagement with the synchronizer. The second coupling unit 12b may suitably be a synchronizer or similar arrangement arranged on the second input gear shaft 6b. The synchronizer may be of any configuration suitable for hybrid transmissions. The seventh gear wheel 9g is journally connected to the second input gear shaft 6b via a third bearing 13c, and the first gear wheel 9a is journally connected to the second input gear shaft 6b via a fourth bearing 13d. The synchronizer is providing an efficient shifting between the first gear wheel 9a and the seventh gear wheel 9g. The third bearing 13c and the fourth bearing 13d are used to provide an idle position for the seventh gear wheel 9g and the first gear wheel 9a respectively when not in driving engagement with the synchronizer.

The gearing between the respective first gear wheel 9a and second gear wheel 9b, the third gear wheel 9c and fourth gear wheel 9d, the fifth gear wheel 9e and sixth gear wheel 9f, the seventh gear wheel 9g and eight gear wheel 9h, and the first torque transmission member 10a and second torque transmission member 10b, may be selected to match the specific powertrain configuration and may depend on the size of the electric motors and the internal combustion engine, the type of hybrid vehicle in which the transmission and powertrain are used, and on the desired performance and driving characteristics.

In the fourth embodiment, the transmission 4 is in a first mode configured to transfer torque to the output gear shaft 8 from the second input gear shaft 6b, via the second coupling unit 12a, the first gear wheel 9a, the second gear wheel 9b, the intermediate gear shaft 7, the third gear wheel 9c, and the fourth gear wheel 9d, with the first gear ratio. In a second mode, the transmission 4 is configured to transfer torque to the output gear shaft 8 from the first input gear shaft 6a, via the first coupling unit 12a, the first torque transmission member 10a, the flexible member 11, and the second torque transmission member 10b, with the second gear ratio. In a third mode, the transmission 4 is configured to transfer torque to the output gear shaft 8 from the first input gear shaft 6a, via the first coupling unit 12a, the fifth gear wheel 9e, the sixth gear wheel 9f, the intermediate gear shaft 7, the third gear wheel 9c, and the fourth gear wheel 9d. In a fourth mode, the transmission 4 is configured to transfer torque to the output gear shaft 8 from the second input gear shaft 6b, via the second coupling unit 12b, the seventh gear wheel 9g, the eight gear wheel 9h, the intermediate gear shaft 7, the third gear wheel 9c, and the fourth gear wheel 9d.

The first mode with the first gear ratio, the third mode with the third gear ratio, or the fourth mode with the fourth gear ratio may suitably be used for forward driving at lower speeds and for reverse driving. The second gear ratio with the torque transmission members is suitably used for forward driving at higher speeds. The sizes of and number of gears on the gear wheels may be suitably selected for a specific gearing that is matching the vehicle construction, and in the same way, the sizes of the torque transmission members may be suitably selected for a specific gearing. In a boost forward gear mode, the powertrain system 1 may be configured to transfer torque to the output gear shaft 8 simultaneously by the first electric motor 2a, the second electric motor 2b, and the internal combustion engine 3. When the three power sources are operated together, a maximum power can be provided to the output gear shaft 8 via the transmission 4. In a charge mode, the powertrain system 1 may be configured for charging a battery pack 14, where the first electric motor 2a and/or the second electric motor 2b are used as generators driven by the internal combustion engine. In the charge mode, the propulsion of the vehicle may be accomplished with the internal combustion engine 3 alone or in combination with any of the electric motors 2a,2b.

To operate the powertrain in the fourth embodiment, the first electric motor 2a or the second electric motor 2b may suitably provide torque to the output gear shaft 8 at lower speeds, at reverse driving, and also at higher speeds. The second electric motor 2b may be arranged to provide torque to the output gear shaft 8, either on its own or together with the internal combustion engine 3 in hybrid drive via the connected clutch 5.

When the powertrain system 1 of the fourth embodiment is operated, the first electric motor 2a is connected to the first input gear shaft 6a, the second electric motor 2b to the second input gear shaft 6b, and the internal combustion engine 3 to the second input gear shaft 6b via the clutch 5. The clutch 5 is selectively connecting the internal combustion engine 3 to and disconnecting the internal combustion engine 3 from the second input gear shaft 6b. When receiving a command to operate the powertrain system 1 with a first gear ratio, torque is transferred from the second input gear shaft 6b to the output gear shaft 8 via the intermediate gear shaft 7 for providing the first gear ratio, wherein the first gear wheel 9a is interacting with the second gear wheel 9b and the third gear wheel 9c is interacting with the fourth gear wheel 9d. In this operational mode, the second coupling unit 12b is engaging the first gear wheel 9a, and is disconnected from the seventh gear wheel 9g. When receiving a command to operate the powertrain system 1 with a second gear ratio, torque is transferred from the first input gear shaft 6a directly to the output gear shaft 8 for providing the second gear ratio, wherein the first torque transmission member 10a is interacting with the second torque transmission member 10b via the flexible member 11. In this operational mode, the first coupling unit 12a is engaging the first torque transmission member 10a, and is disconnected from the fifth gear wheel 9e. When receiving a command to operate the powertrain system 1 with a third gear ratio, torque is transferred from the first input gear shaft 6a to the output gear shaft 8 via the intermediate gear shaft 7 for providing the third gear ratio, wherein the fifth gear wheel 9e is interacting with the sixth gear wheel 9f and the third gear wheel 9c is interacting with the fourth gear wheel 9d. In this operational mode, the first coupling unit 12a is engaging the fifth gear wheel 9e, and is disconnected from the first torque transmission member 10a. When receiving a command to operate the powertrain system 1 with a fourth gear ratio, torque is transferred from the second input gear shaft 6b to the output gear shaft 8 via the intermediate gear shaft 7 for providing the third gear ratio, wherein the seventh gear wheel 9g is interacting with the eight gear wheel 9h and the third gear wheel 9c is interacting with the fourth gear wheel 9d. In this operational mode, the second coupling unit 12b is engaging the seventh gear wheel 9g, and is disconnected from the first gear wheel 9a.

In the different embodiments described, the first torque transmission member 10a may be a first chain sprocket, the second torque transmission member 10b a second chain sprocket, and the flexible member 11 a chain. The first chain sprocket and the second chain sprocket are arranged to interact with each other via the chain for transferring torque between the torque transmission members. As an alternative, the first torque transmission member 10a may be a first belt pulley, the second torque transmission member 10b a second belt pulley, and the flexible member 11 a belt. The first belt pulley and the second belt pulley are arranged to interact with each other via the belt.

The pair of interacting gears used in the embodiments described above may have different gear ratios depending on the construction and design of the transmission and powertrain, which further may be dependent on the type of vehicle in which the powertrain is used.

Figure 4:
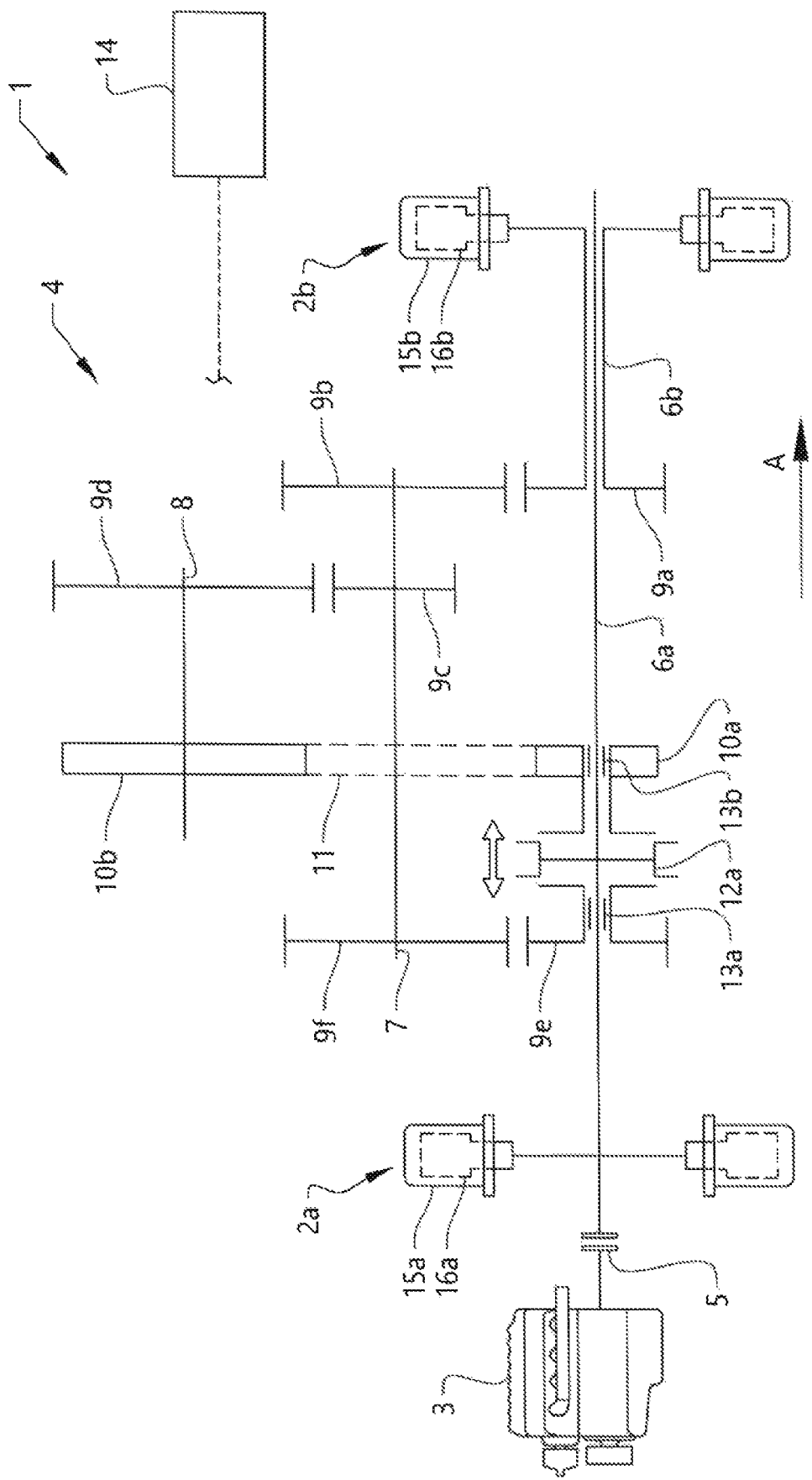
FIG. 4 shows schematically, an alternative layout view of a three gear ratio single-clutch powertrain system according to the disclosure.

The first electric motor 2a and the second electric motor 2b may be arranged on the same side of the transmission 4, as schematically illustrated in FIGS. 1A-1B, 2A-2C, and 3A-3C, or alternatively on different sides of the transmission 4 as schematically illustrated in FIG. 4. In the first, second, third, and fourth embodiments described above and illustrated in FIGS. 1A-1B, 2A-2C, and 3A-3C, the first electric motor 2a and the second electric motor 2b are arranged on the same side of the transmission 4. It would however, as an alternative design solution, be possible to connect the first electric motor 2a in the first and third embodiments to the other side of the first input shaft 6a, and the second electric motor 2b in the second and fourth embodiments to the other side of the second input shaft 6b. In FIG. 4, a powertrain system 1 is schematically illustrated, where the first electric motor 2a and the second electric motor 2b are arranged on different sides of the transmission 4. The powertrain system in FIG. 4 comprises a transmission 4 identical to the transmission 4 illustrated in FIG. 2A, and the first electric motor 2a and the clutch 5 illustrated in FIG. 4 are arranged on a side opposite the second electric motor 2b.

The electric motors 2a,2b in the different embodiments described and illustrated may also be used to generate power during braking. It may be possible to design the transmission 4 without synchronizers and instead use other types of coupling units having similar coupling function as synchronizers, since the electric motors 2a,2b can be arranged for synchronizing the rotational speed when shifting gears.

With single-clutch powertrain is meant a powertrain system comprising only one clutch, which is used for connecting and disconnecting the internal combustion engine from the transmission, which differs from conventional hybrid powertrains where more than one clutch are commonly used. Although the powertrain according to the disclosure comprises a clutch, there is no torque interruption when changing gears, since each electric motor can operate on each gear at the same time.

In the different embodiments described above, the electric motors may have any suitable configuration with a rotor and a stator. The internal combustion engine may also be of any conventional type suitable for hybrid propulsion. The electric motors may be operated individually or in combination with each other. The internal combustion engine may be operated alone, simultaneously with one of the electric motors, or simultaneously with both electric motors. If the electric motors are not in driving engagement with the transmission, the rotors of the respective electric motors are arranged to rotate with the respective input gear shafts without providing torque to the respective input gear shaft. The clutch may be of any design and configuration suitable for a hybrid powertrain system. The coupling units or synchronizers may be slidingly connected to the respective first and second input gear shafts, and conventionally arranged with splined connections or similar arrangements for interaction with gear wheels and torque transmission members. The system may further comprise a control unit for controlling the operation of the powertrain system, where the control unit may control the electric motors, the internal combustion engine, the clutch, the coupling units and other components of the system.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Single-clutch powertrain system
2a: First electric motor
2b: Second electric motor
3: Internal combustion engine
4: Transmission
5: Clutch
6a: First input gear shaft
6b: Second input gear shaft
7: Intermediate gear shaft
8: Output gear shaft
9a: First gear wheel
9b: Second gear wheel
9c: Third gear wheel
9d: Fourth gear wheel
9e: Fifth gear wheel
9f: Sixth gear wheel
9g: Seventh gear wheel
9h: Eight gear wheel
10a: First torque transmission member
10b: Second torque transmission member
11: Flexible member
12a: First coupling unit
12b: Second coupling unit
13a: First bearing
13b: Second bearing
13c: Third bearing
13d: Fourth bearing
14: Battery pack
15a: First stator
15b: Second stator
16a: First rotor
16b: Second rotor

What is claimed is:

1. A transmission for a vehicle comprising a first input gear shaft, a second input gear shaft, an intermediate gear shaft and an output gear shaft,
   wherein the first input gear shaft comprises a first torque transmission member, and the second input gear shaft comprises a first gear wheel,
   wherein the intermediate gear shaft comprises a second gear wheel, and a third gear wheel,
   wherein the output gear shaft comprises a fourth gear wheel and a second torque transmission member,
   wherein the third gear wheel and the fourth gear wheel are arranged to interact with each other for transferring torque from the intermediate gear shaft to the output gear shaft,
   wherein the first gear wheel and the second gear wheel are arranged to interact with each other for providing a first gear ratio, and wherein the first torque transmission member and the second torque transmission member are arranged to interact with each other via a flexible member for providing a second gear ratio.

2. A transmission according to claim 1,
   wherein in a first mode, the transmission is configured to transfer torque to the output gear shaft from the second input gear shaft, via the first gear wheel, the second gear wheel, the intermediate gear shaft, the third gear wheel, and the fourth gear wheel, and
   wherein in a second mode, the transmission is configured to transfer torque to the output gear shaft from the first input gear shaft, via the first torque transmission member, the flexible member, and the second torque transmission member.

3. A transmission according to claim 1, wherein the first input gear shaft further comprises a fifth gear wheel and the intermediate gear shaft further comprises a sixth gear wheel, wherein the fifth gear wheel and the sixth gear wheel are arranged to interact with each other for providing a third gear ratio.

4. A transmission according to claim 3, wherein the transmission further comprises a first coupling unit arranged on the first input gear shaft, wherein the first coupling unit is arranged for selective interaction between the fifth gear wheel and the first torque transmission member for changing gear ratio.

5. A transmission according to claim 4,
wherein the first coupling unit is a synchronizer arranged on the first input gear shaft, wherein the fifth gear wheel is journally connected to the first input gear shaft via a first bearing, and wherein the first torque transmission member is journally connected to the first input gear shaft via a second bearing.

6. A transmission according to claim 3,
wherein in a third mode, the transmission is configured to transfer torque to the output gear shaft from the first input gear shaft, via the fifth gear wheel, the sixth gear wheel, the intermediate gear shaft, the third gear wheel, and the fourth gear wheel.

7. A transmission according to claim 1,
wherein the second input gear shaft further comprises a seventh gear wheel and the intermediate gear shaft further comprises an eight gear wheel, wherein the seventh gear wheel and the eight gear wheel are arranged to interact with each other for providing a fourth gear ratio.

8. A transmission according to claim 7,
wherein the transmission further comprises a second coupling unit arranged on the second input gear shaft, wherein the second coupling unit is arranged for selective interaction between the seventh gear wheel and the first gear wheel for changing gear ratio.

9. A transmission according to claim 8,
wherein the second coupling unit is a synchronizer arranged on the second input gear shaft, wherein the seventh gear wheel is journally connected to the second input gear shaft via a third bearing, and wherein the first gear wheel is journally connected to the second input gear shaft via a fourth bearing.

10. A transmission according to claim 7,
wherein in a fourth mode, the transmission is configured to transfer torque to the output gear shaft from the second input gear shaft, via the seventh gear wheel, the eight gear wheel, the intermediate gear shaft, the third gear wheel, and the fourth gear wheel.

11. A transmission according to claim 1,
wherein the first torque transmission member is a first chain sprocket, the second torque transmission member is a second chain sprocket, and the flexible member is a chain, wherein the first chain sprocket and the second chain sprocket are arranged to interact with each other via the chain; or
wherein the first torque transmission member is a first belt pulley, the second torque transmission member is a second belt pulley, and the flexible member is a belt, wherein the first belt pulley and the second belt pulley are arranged to interact with each other via the belt.

12. A single-clutch powertrain system for hybrid vehicles comprising a transmission according to claim 1, wherein the system further comprises a first electric motor, a second electric motor, an internal combustion engine, and a clutch, wherein the first electric motor is connected to the first input gear shaft, the second electric motor is connected to the second input gear shaft,
wherein the internal combustion engine is connectable to the first input gear shaft via the clutch, wherein the clutch is arranged to selectively connect the internal combustion engine to and disconnect the internal combustion engine from the first input gear shaft, or wherein the internal combustion engine is connectable to the second input gear shaft via the clutch, wherein the clutch is arranged to selectively connect the internal combustion engine to and disconnect the internal combustion engine from the second input gear shaft.

13. A single-clutch powertrain system according to claim 12,
wherein the system is configured to transfer torque to the first input gear shaft by the first electric motor and/or the internal combustion engine, and transfer torque to the second input gear shaft by the second electric motor, or wherein the system is configured to transfer torque to the first input gear shaft by the first electric motor, and transfer torque to the second input gear shaft by the second electric motor and/or the internal combustion engine.

14. A method for operating a single-clutch powertrain system for hybrid vehicles, wherein the powertrain system comprises a first electric motor, a second electric motor, an internal combustion engine, a transmission, and a clutch, wherein the transmission comprises a first input gear shaft, a second input gear shaft, an intermediate gear shaft and an output gear shaft, wherein the first input gear shaft comprises a first torque transmission member, and the second input gear shaft comprises a first gear wheel, wherein the intermediate gear shaft comprises a second gear wheel, and a third gear wheel, wherein the output gear shaft comprises a fourth gear wheel and a second torque transmission member, wherein the method comprises the steps:
connecting the first electric motor to the first input gear shaft, the second electric motor to the second input gear shaft, and the internal combustion engine to the first input gear shaft or the second input gear shaft via the clutch, wherein the clutch is selectively connecting the internal combustion engine to and disconnecting the internal combustion engine from the first input gear shaft or the second input gear shaft;
when receiving a command to operate the powertrain system with a first gear ratio, transferring torque from the second input gear shaft to the output gear shaft via the intermediate gear shaft for providing the first gear ratio, wherein the first gear wheel is interacting with the second gear wheel and the third gear wheel is interacting with the fourth gear wheel; and
when receiving a command to operate the powertrain system with a second gear ratio, transferring torque from the first input gear shaft directly to the output gear shaft for providing the second gear ratio, wherein the first torque transmission member is interacting with the second torque transmission member via a flexible member.

15. A method for operating a single-clutch powertrain system according to claim 14, wherein the first input gear shaft further comprises a fifth gear wheel and the intermediate gear shaft further comprises a sixth gear wheel, wherein the method further comprises the step:
when receiving a command to operate the powertrain system with a third gear ratio, transferring torque from the first input gear shaft to the output gear shaft via the intermediate gear shaft for providing the third gear ratio, wherein the fifth gear wheel is interacting with the sixth gear wheel and the third gear wheel is interacting with the fourth gear wheel.

16. A method for operating a single-clutch powertrain system according to claim 14, wherein the second input gear shaft further comprises a seventh gear wheel and the intermediate gear shaft further comprises an eight gear wheel, wherein the method further comprises the step:

when receiving a command to operate the powertrain system with a fourth gear ratio, transferring torque from the second input gear shaft to the output gear shaft via the intermediate gear shaft for providing the third gear ratio, wherein the seventh gear wheel is interacting with the eight gear wheel and the third gear wheel is interacting with the fourth gear wheel.

* * * * *